United States Patent [19]

Takehara et al.

[11] Patent Number: 5,037,119
[45] Date of Patent: Aug. 6, 1991

[54] SUSPENSION-STEERING CONTROL APPARATUS

[75] Inventors: Shin Takehara; Toshiki Morita; Shigefumi Hirabayashi; Toshio Nakajima, all of Hiroshima, Japan

[73] Assignee: Mazda Motor Corporation, Hiroshima, Japan

[21] Appl. No.: 462,420

[22] Filed: Jan. 9, 1990

[30] Foreign Application Priority Data

Jan. 10, 1989 [JP] Japan .................................. 1-4004

[51] Int. Cl.[5] .............................................. B62D 7/14
[52] U.S. Cl. .................................... 280/91; 280/772; 280/707
[58] Field of Search ........................ 280/91, 772, 707; 180/140, 142

[56] References Cited

U.S. PATENT DOCUMENTS

4,828,283 5/1989 Ishii et al. ............................ 280/91
4,895,383 1/1990 Abe et al. ............................ 280/91

Primary Examiner—Kenneth R. Rice
Attorney, Agent, or Firm—Fish & Richardson

[57] ABSTRACT

A suspension-steering control apparatus is provided with suspension-characteristic changing means for changing a suspension characteristic and a rear-wheel steering mechanism for steering rear wheels of a vehicle. The suspension characteristics is such that, for example, a magnitude of a damping force of a suspension or a rolling rigidity ratio of the rear portion of the vehicle body to the front portion thereof can be changed. The rear-wheel steering mechanism is controlled on the basis of a predetermined steering characteristic. The steering-characteristic is corrected in synchronization with alteration of the suspension characteristic.

23 Claims, 9 Drawing Sheets

SUSPENSION-STEERING CONTROL APPARATUS

BACKGROUND OF THE INVENTION

1. Field of the Invention

The present invention relates to a suspension-steering control apparatus in a four-wheel steering vehicle in which the rear wheels are steered together with the front wheels.

2. Description of Related Art

Heretofore, there is a suspension apparatus of a vehicle which alters its suspension characteristics to a harder or softer state by changing a damping force of a damper. For example, Japanese Utility Model Examined Publication (kokoku) No. 45,129/1983 discloses a suspension apparatus in which a suspension characteristic is changed during a high speed driving so as to allow the damping force of a damper on the front wheel side to be higher than on the rear wheel side, thereby understeering its steering characteristic and improving a driving stability.

It is also known that a four-wheel steering vehicle has a basic function of steering the rear wheels to a steering angle in accordance with a steering angle of the front wheels, when the front wheels are being steered, on the basis of a given rear-wheel steering characteristic preset with respect to the front wheels, the suspension characteristic being capable of being conveniently corrected. For example, Japanese Patent Unexamined Publication (kokai) No. 220,972/1986 discloses a suspension apparatus which corrects a steering characteristic on the same phase side as the front wheels during driving at a low speed, thereby improving cornering at the time of driving at a low speed.

As have been described hereinabove, for the four-wheel steering vehicle in which the suspension characteristic is variable, it is common that the suspension characteristic is changed independently from control over steering of the rear wheels.

SUMMARY OF THE INVENTION

Therefore, the present invention has the object to provide a control apparatus in which the suspension-characteristic control is interconnected with the steering control, thereby improving drivability of the vehicle.

In order to achieve the above object, the present invention consists of a suspension-steering control apparatus comprising:

suspension-characteristic changing means for changing a suspension characteristic;
a rear-wheel steering mechanism for steering rear wheels of a vehicle;
steering control means for controlling the rear-wheel steering mechanism on the basis of a predetermined steering characteristic; and
steering-characteristic correcting means for correcting the steering characteristic in synchronization with alteration of the suspension characteristic by the suspension-characteristic changing means.

With the arrangement as have been described hereinabove, the suspension-steering control apparatus according to the present invention can provide a steering characteristic suitable for a driving state of the vehicle, thereby performing an improved drivability, because the rear-wheel steering characteristic is corrected in synchronization with alteration in the suspension characteristic.

In particular, if the rear-wheel steering characteristic is corrected toward the reverse phase side with respect to the front wheels in synchronization with alteration in the suspension characteristic with a decreasing tendency of understeer, this decreasingly understeering tendency can be promoted to thereby improve a sport type drivability of the vehicle and a driving stability.

On the contrary, if the rear-wheel steering characteristic is corrected toward the reverse phase side with respect to the front wheels in synchronization with alteration in the suspension characteristic with an increasingly understeering tendency, the increasing tendency of understeer is blocked and offset, thereby reducing an impact of the steering characteristic upon driving, thereby improving drivability.

Other objects, features and advantages of the present invention will become apparent in the course of the description of the preferred embodiments which follows, with reference to the accompanying drawings.

DETAILED DESCRIPTION OF THE PREFERRED EMBODIMENTS

The present invention will be described in more detail by way of examples with reference to the accompanying drawings. In the drawings, postfixes "F" and "R" after reference numerals or symbols mean 'front' and 'rear', respectively, and postfixes "L" and "R" after the postfixes "F" and "R" mean 'left-hand' and 'right-hand', respectively. For example, reference symbol "FL" means a left-hand front side and reference symbol "FR" means a right-hand front side, while reference symbols "RL" and "RR" mean 'left-hand rear side' and 'right-hand rear side', respectively.

Figure 1:
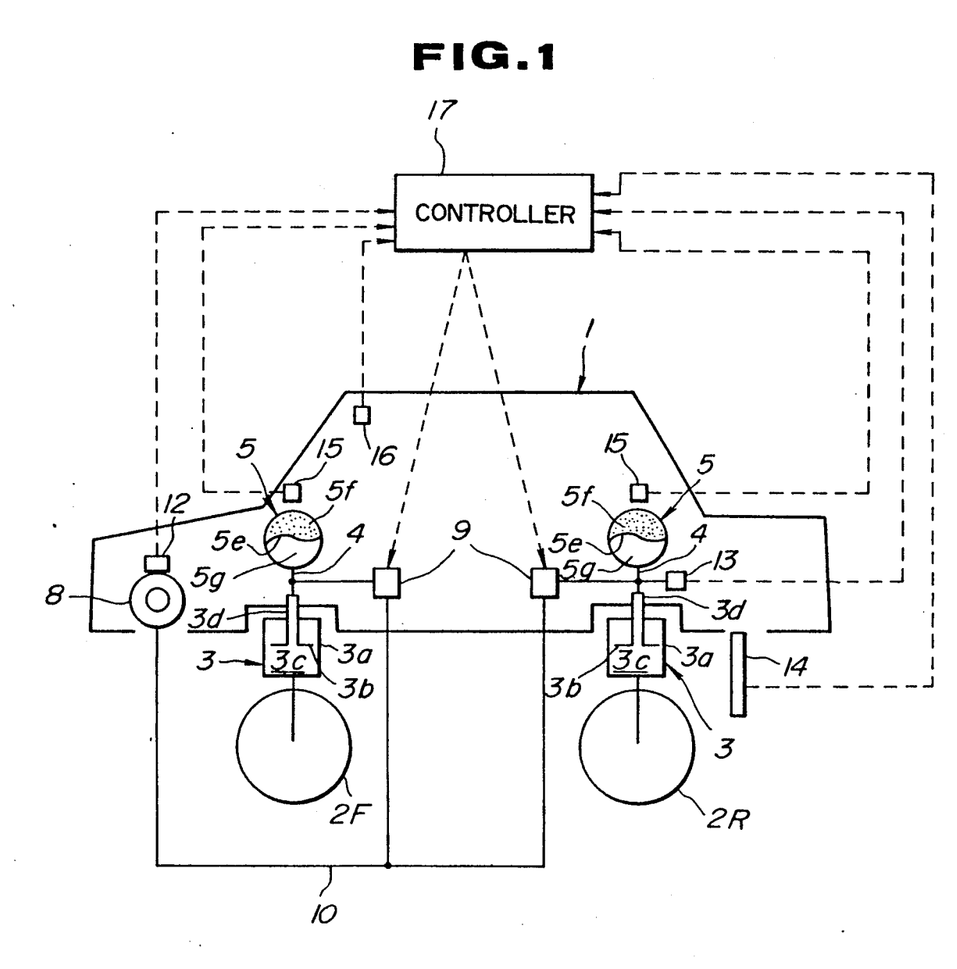
FIG. 1 is a side view showing a vehicle to which an example of the present invention is applied.

FIG. 1 represents an outline of a suspension apparatus of a vehicle, as an automobile.

As shown in FIG. 1, a vehicle body 1 has two front wheels 2F and two rear wheels 2R. Between the vehicle body 1 and each of the front wheels 2F is disposed a fluid cylinder 3. Likewise, a fluid cylinder 3 is provided between the vehicle body 1 and each of the rear wheels 2R. The fluid cylinder 3 comprises a cylinder body 3a and a piston 3b which is mounted in the cylinder body 3a and defines a liquid pressure chamber 3c. The piston 3b is connected to a rod 3d which, in turn, is connected at its upper end portion to the vehicle body 1. The cylinder body 3a is connected to each of the corresponding front and rear wheels 2F and 2R.

The liquid pressure chamber 3c of the fluid cylinder 3 is communicated through a pressure passage 4 with a gas spring 5 which is divided by a diaphragm 5e into a gas chamber 5f and a liquid pressure chamber which in turn is communicated with the liquid pressure chamber 3c of the fluid cylinder 3.

To an oil pressure pump 8 is connected through a liquid pressure tubular passage 10 a proportional flow amount control valve 9 which has the function to adjust a flow amount of the liquid pressure chamber 3c of each of the fluid cylinders 3F and 3R by supplying oil to or discharging it from the liquid pressure chamber 3c.

As shown further in FIG. 1, reference numeral 12 denotes an oil-discharging pressure meter for sensing an oil-discharging pressure of the oil pressure pump 8, reference numeral 13 denotes a liquid pressure sensor for sensing a liquid pressure of the liquid pressure chamber 3c of each of the fluid cylinders 3, reference numeral 14 denotes a ride height sensor for sensing a vehicle's ride height (a cylinder stroke amount) of the corresponding wheel 2F or 2R, and reference numeral 15 denotes a vertical acceleration sensor for sensing a vertical acceleration of the vehicle body (a vertical acceleration of a sprang weight of each of the wheels. 2F and 2R). Upward of each of the left-hand and right-hand front wheels 2F on an approximately horizontal plane of the vehicle body, there is disposed each one of the oil-discharging pressure meter 12, the liquid pressure sensor 13, the ride height sensor 14 and the vertical acceleration sensor 15. In a middle portion of the transverse vehicle body between the left-hand and right-hand rear wheels 2R, there is likewise disposed each one of the oil-discharging pressure meter 12, the liquid pressure sensor 13, the ride height sensor 14 and the vertical acceleration sensor 15. Reference numeral 16 stands for a vehicle speed sensor for sensing a vehicle speed of the vehicle. Signals sensed by the meters and the sensors enter a controller 17 for variable control of suspension characteristics, which is provided with a central processing unit (CPU) and so on.

Figure 2A:
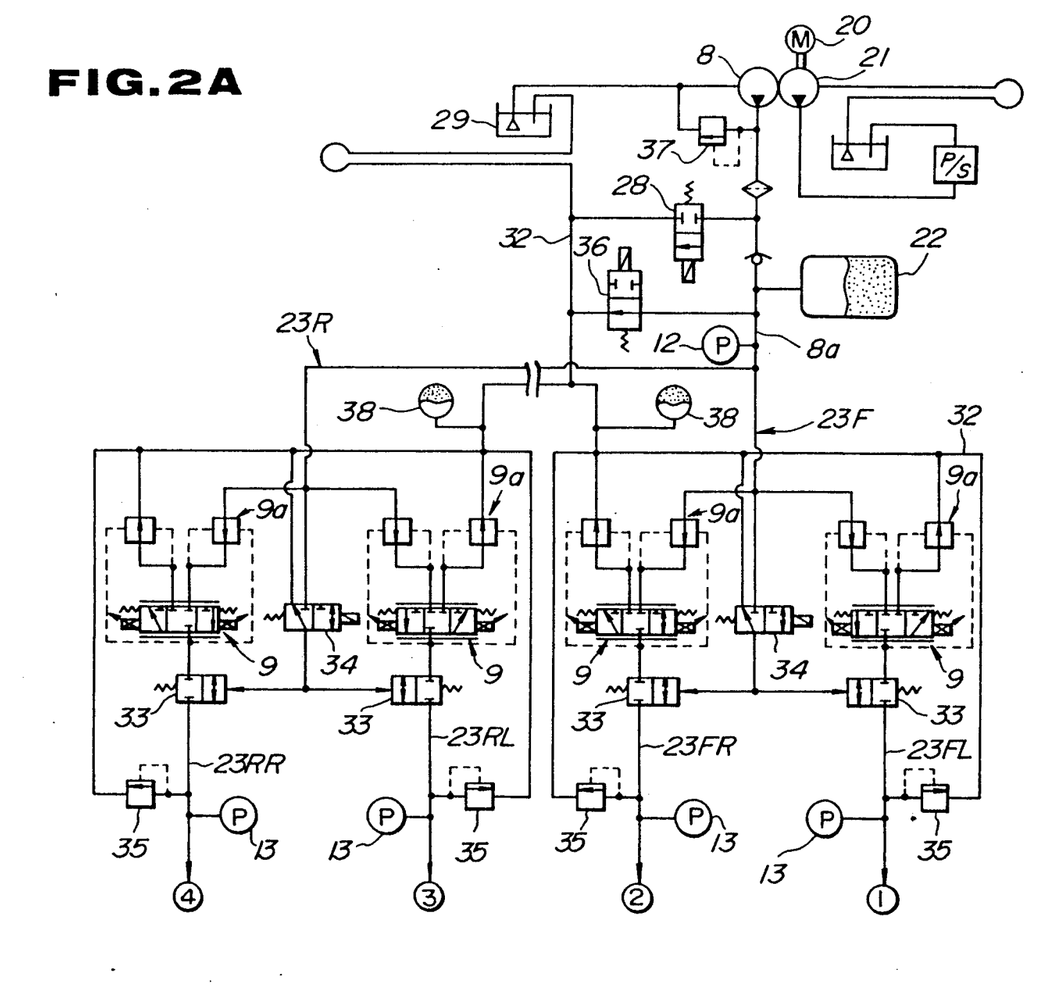
FIGS. 2A and 2B each are a diagram showing one example of an oil pressure circuit to be used for the present invention.
Figure 2B:
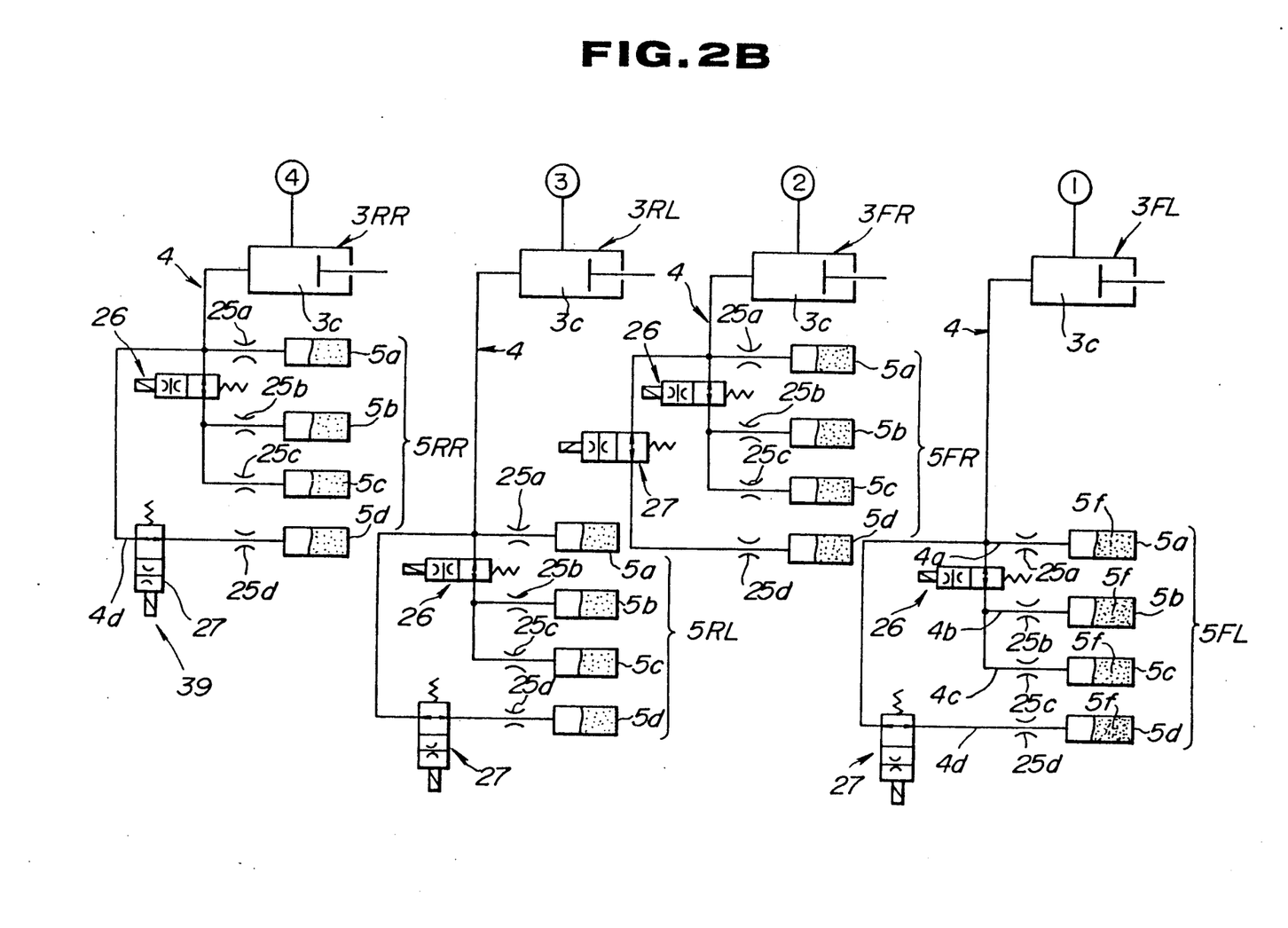

FIGS. 2A and 2B show oil pressure circuits for control over a supply or discharge of oil to or from the liquid pressure chamber 3c of the fluid cylinder 3. The oil pressure pump 8 is connected continuously to an oil pressure pump 21 for a power steering unit to be driven by a driving source 20. The oil pressure pump 8 is communicated through its discharging tube 8a with an accumulator 22. To the discharging tube 8a are connected at its downstream side a front-wheel side piping 23F and a rear-wheel side piping 23R, which are disposed in Parallel to each other. To the front-wheel side piping 23F are connected a left-hand front-wheel side piping 23FL parallel to a right-hand front-wheel side piping 23FR. The left-hand front-wheel side piping 23FL is communicated with the liquid pressure chamber 3c of the fluid cylinder 3FL of the corresponding left-hand front wheel 2FL, while the right-hand front-wheel side piping 23FR is communicated with the liquid pressure chamber 3c of the fluid cylinder 3FR corresponding to the right-hand front wheel 2FR. Likewise, the left-hand rear-wheel side piping 23RL is communicated with the liquid pressure chamber 3c of the fluid cylinder 3FL for the corresponding rear wheel 2RL, while the right-hand rear-wheel side piping 23RR is communicated with the liquid pressure chamber 3c of the fluid cylinder 3RR corresponding to the right-hand rear wheel 2RR.

To the fluid cylinders 3FL, 3FR, 3RL and 3RR are connected the gas springs 5FL, 5FR, 5RL and 5RR, respectively. Each of the gas springs 5FL, 5FR, 5RL and 5RR comprises four gas spring sections, namely, a first gas spring section 5a, a second gas spring section 5b, a third gas spring section 5c and a fourth gas spring section 5d. The four gas spring sections 5a, 5b, 5c and 5d are disposed in parallel to each other through respective branch passages 4a, 4b, 4c and 4d with respect to a common passage 4 which is communicated with the liquid pressure chamber 3c of the fluid cylinder 3 corresponding to the gas spring 5. The four gas spring sections 5a, 5b, 5c and 5d are provided on the respective branch passages 4a, 4b, 4c and 4d with orifices 25a, 25b, 25c and 25d, respectively, and play a basic function as a suspension device by the help of their respective damping action and their buffer action of gas filled in the gas chamber 5f of the corresponding gas spring sections 5a, 5b, 5c and 5d. For each of the gas springs 5FL, 5FR, 5RL and 5RR, a passage between the branch passage 4a for the first gas spring section 5a and the branch passage 4b for the second gas spring section 5b is provided with a damping-force shifting valve 26 for adjusting a passage area of the passage. The damping-force shifting valve 26 has two positions: a first position for opening the passage and a second position for closing the passage. Thus, when the vehicle is cornering, the valve 26 is shifted to the second position and controls a supply of the oil to the liquid pressure chambers of the second and third spring sections 5b and 5c, respectively, and a discharge of the oil therefrom, thereby restricting the oil required for the supply to the liquid pressure chamber 5c of the liquid pressure cylinder 3 or for the discharge therefrom to a smaller amount at the time of cornering and thus improving responsiveness to control over cornering.

Likewise, the branch passage 4d is provided with a shift valve 27 which has two positions: a first position for opening the branch passage 4d and a second position for shutting up the branch passage 4d. Shifting of the shift valve 27 to the first position permits a supply of the oil to the liquid pressure chamber of the fourth spring section 5d or a discharge of the oil therefrom, thereby changing a suspension characteristic to a softer state. When the shift valve 27 is shifted to the second position, the supply of the oil to the liquid pressure chamber of the fourth spring section 5d or the discharge of the oil therefrom is regulated, thereby changing the suspension characteristic to a harder state. A first suspension-characteristic changing means 39 is arranged such that the suspension characteristic is changed to a softer state by shifting the shift valve 27 to the first position or the suspension characteristic is changed to the second position to a harder state by shifting the shift valve 27 to the second position.

To the discharging tube 8a of the oil pressure pump 8 nearby the accumulator 22 is connected an unload relief valve 28 which is provided with an opening position and a closing position. When the discharging pressure meter 12 measures the oil-discharging pressure at a value higher than a set upper limit, the unload relief valve 28 is shifted to its opening position, thereby returning the oil of the oil pressure pump 8 to a reserve tank 29 and retaining a value for accumulating a pressure of the oil of the accumulator 22 to a set value. The oil is supplied to each of the fluid cylinders 3 by means of the oil accumulated in the accumulator 22.

As the constructions of the left-hand and right-hand front wheels 2FL and 2FR and the left-hand and right-hand rear wheels 2RL and 2RR are all the same, the following description is directed only to the left-hand front wheel side and a description on the rest is omitted for brevity of explanation.

Referring to FIG. 2A, the left-hand front-wheel side piping 23FL has the proportional flow amount control valve 9 which is provided with three positions: a suspension position at which all ports are closed, a supply position at which the left-hand front-wheel side piping 23FL is opened, and a discharge position at which the fluid cylinder 3 side of the left-hand front-wheel side piping 23FL is communicated with a return pipe 32. The proportional flow amount control valve 9 is equipped with a pressure regulating valve 9a which permits the liquid pressure in the liquid pressure chamber 3c of the fluid cylinder 3 to be retained at a given value at the supply and discharge positions.

Furthermore, on the fluid cylinder 3 side of the proportional flow amount control valve 9 is provided a switch valve 33 on the left-hand front-wheel side piping 23FL, which is of a type operable in response to a pilot pressure to open or close the left-hand front-wheel side piping 23FL. When an electromagnetic valve 34 is opened, a liquid pressure of the left-hand front-wheel side piping 23FL on the oil pressure pump 8 side of the proportional flow amount control valve 9 is introduced into the valve 33 as the pilot pressure. As the pilot pressure reaches a given value or higher, the valve 33 is opened to communicate the proportional flow amount control valve 9 with the left-hand front-wheel side piping 23FL, thereby allowing the proportional flow amount control valve 9 to control a flow amount to the fluid cylinder 3. When the switch valve 33 is closed, the left-hand front-wheel side piping 23FL is closed in a liquid-tight way to thereby ensure a prevention of leakage of the oil from the liquid pressure chamber 3c of the fluid cylinder 3.

As shown further in FIG. 2A, a relief valve 35 is connected to the left-hand front-wheel side piping 23FL, which serves as returning the oil to the return pipe 32 by means of its opening operation when the liquid pressure in the liquid pressure chamber 3c of the fluid cylinder 3 is caused to arise to an abnormally high level.

As shown in FIG. 2A, the ignition-key associated valve 36 is connected to the discharging tube 8a of the oil pressure pump 8 nearby the accumulator 22 connected to the discharging tube 8a, and it has the function of releasing a high-pressure state by returning the oil accumulated in the accumulator 22 to the tank 29 when the valve 36 is opened after turning the ignition off. The oil pressure pump 8 is mounted with an in-pump relief valve 37 in order to lower the oil-discharging pressure of the pump 8 by returning the oil to the tank 29 when the liquid pressure is caused to arise to an abnormally high level. To the return pipe 32 is connected a return accumulator 38 which functions as accumulating pressure when the oil pressure is discharged from the fluid cylinder 3.

Figure 3A:
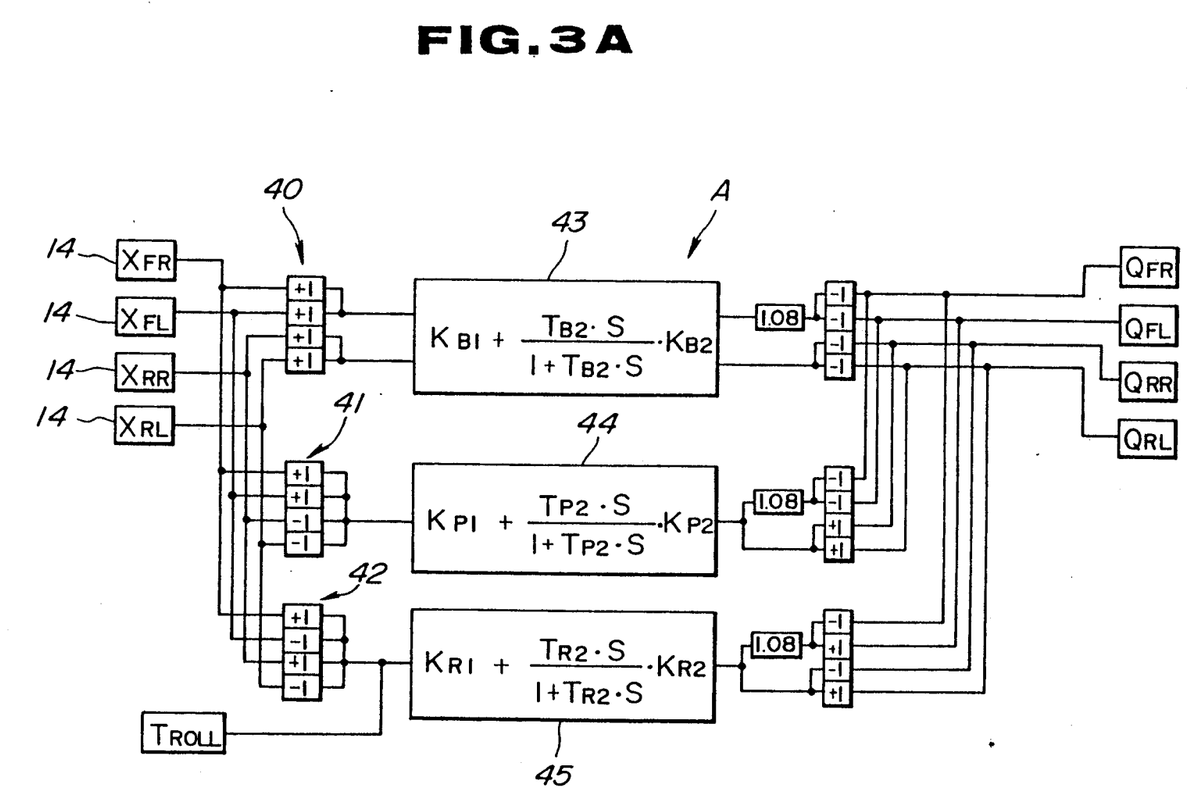
FIGS. 3A–3C each represent one example of control systems for carrying out control over flow amounts.
Figure 3B:
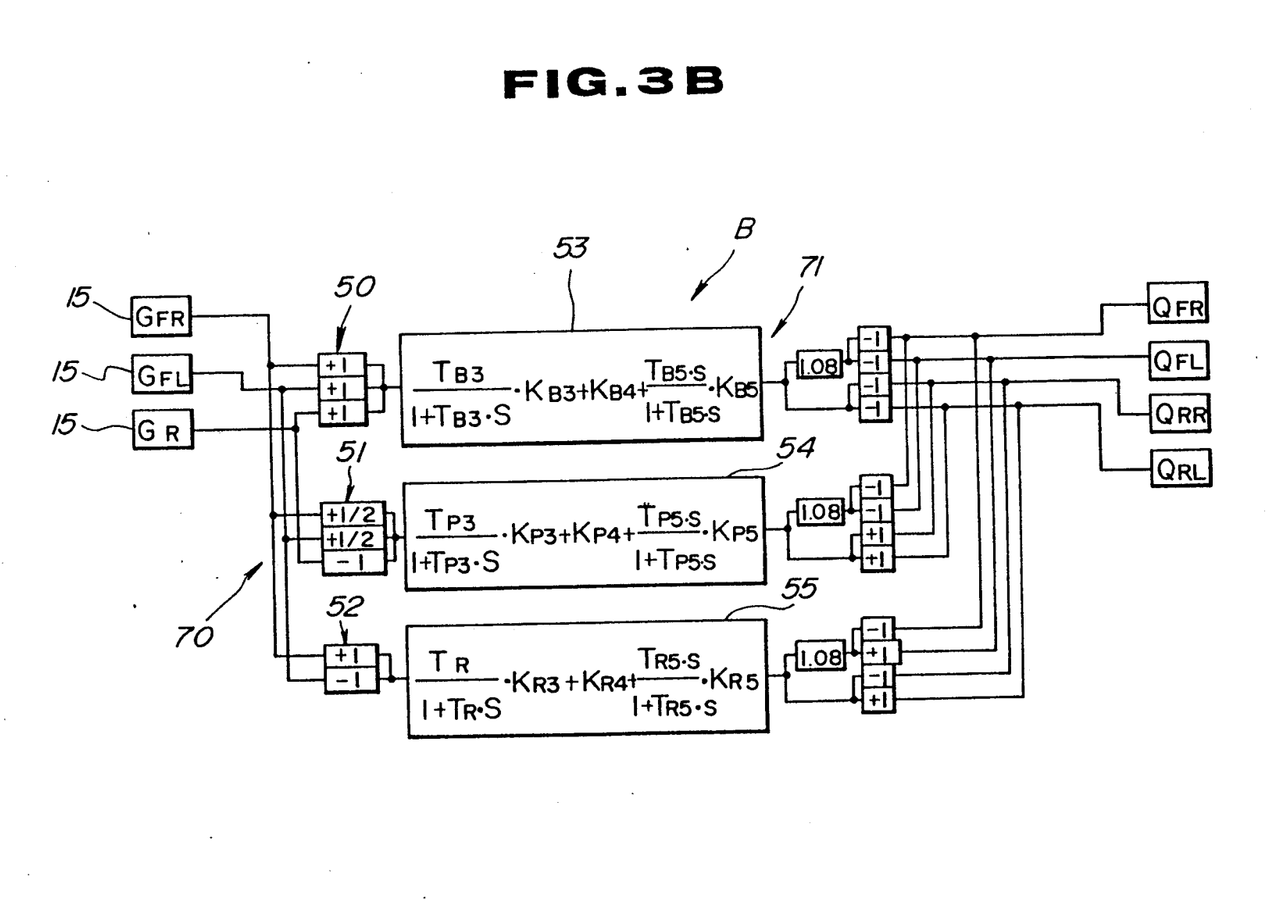
Figure 3C:
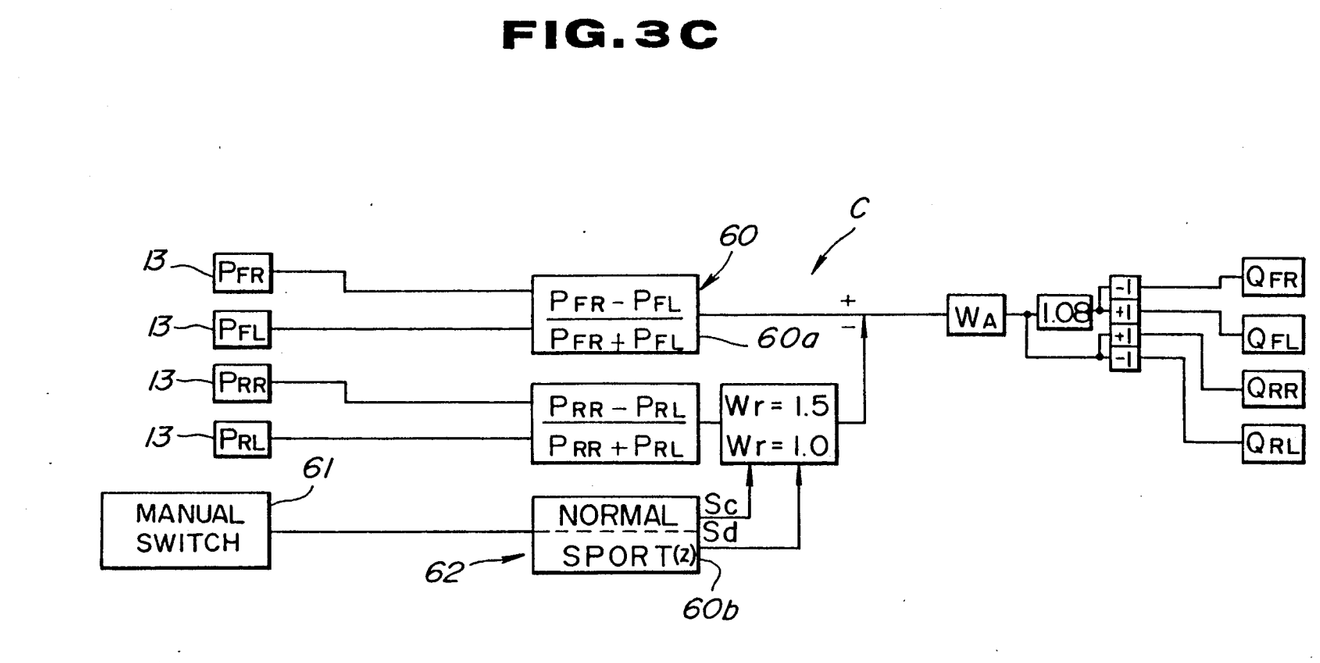

The following is a description on control over changes in suspension characteristics by means of the controller 17 by controlling flow amounts of each of the fluid cylinders 3, with reference to FIGS. 3A to 3C. In the drawings, FIG. 3A shows a control system A for controlling a vehicle's ride height to a target ride height, namely, a cylinder stroke amount to a target amount, on the basis of a signal sensed and generated by the ride height sensor 14 disposed at each of the wheels 2. FIG. 3B shows a control system B for lowering a vertical vibration of the vehicle on the basis of a signal sensed and generated by the three vertical acceleration sensors 15. FIG. 3C is directed to a control system C for uniforming a support load on each of the left-hand and right-hand front and rear wheels 2F and 2R on the basis of a signal sensed and generated by the liquid pressure sensors 13 of each of the wheels.

The control system A is provided with a bounce-component operation unit 40, a pitch-component operation unit 41, and a roll-component operation unit 42. The bounce-component operation unit 40 is to operate a bounce component of vibration of the vehicle by summing output $X_{FL}$ from the ride height sensor 14 for the left-hand front wheel 2FL and output $X_{FR}$ from the ride height sensor 14 for the right-hand front wheel 2FR and summing output $X_{RL}$ from the ride height sensor 14 for the left-hand rear wheel 2RL and $X_{RR}$ from the ride height sensor 14 for the right-hand rear wheel 2RR. The pitch-component operation unit 41 is to operate a pitch component of vibration of the vehicle by subtracting a sum of the outputs, $X_{RL}+X_{RR}$, from a sum of the outputs, $X_{FL}+X_{FR}$. The roll-component operation unit 42 is to operate a roll component of vibration of the vehicle by adding a difference between outputs $X_{FL}$ and $X_{FR}$, $X_{FL}-X_{FR}$, on the side of the left-hand and right-hand front wheels 2FL and 2FR, and a difference between outputs $X_{RL}$ and $X_{RR}$, $X_{RL}-X_{RR}$, on the side of the left-hand and right-hand rear wheels 2RL and 2RR.

The bounce component of vibration of the vehicle operated by the bounce-component operation unit 40 is then inputted into a bounce-component control unit 43. In order to carry out control of the bounce component of vibration, the unit 43 operates a bounce-component control amount to the flow amount control valve 9 of each wheel on the basis of a formula of PD (Proportional-Differential) control as follows:

$$K_{B1}+\{(T_{B2}\times S)/(1+T_{B2}\times S)\}\times K_{B2}$$

(wherein $K_{B1}$, $K_{B2}$, and $T_{B2}$ each are a control coefficient; and S is an operator).

The pitch component of vibration of the vehicle operated by the pitch-component operation unit 41 is then inputted into a pitch-component control unit 44 which operates a pitch-component control amount to the flow amount control valve 9 of each wheel on the basis of a formula of PD (Proportional-Differential) control as follows:

$$K_{P1}+\{(T_{P2}\times S)/(1+T_{P2}\times S)\}\times K_{P2}$$

(wherein $K_{P1}$, $K_{P2}$, and $T_{P2}$ each are a control coefficient; and S is an operator).

The roll component of vibration of the vehicle operated by the roll-component operation unit 42 and a target rolling angle $T_{ROLL}$ is then inputted into a roll-component control unit 45 which likewise operates a roll-component control amount to the flow amount control valve 9 of each wheel on the basis of a formula of PD (Proportional-Differential) control as follows:

$$K_{R1}+\{(T_{R2}\times S)/(1+T_{R2}\times S)\}\times K_{R2}$$

(wherein $K_{R1}$, $K_{R2}$, and $T_{R2}$ each are a control coefficient; and S is an operator).

In order to control the ride height to a target ride height, each of the control amounts operated by each of the control units 43, 44 and 45 at each of the wheels is reversed (the positive (+) and negative (−) directions of the signals inputted from each of the ride height sensors 14 are reversed in the opposite directions) and then the bounce-component, pitch-component and roll-component control amounts are added to thereby provide a control amount of the proportional control valves 9 for each of the wheels: $Q_{FL}$, $Q_{FR}$, $Q_{RL}$ and $Q_{RR}$.

The control system B is provided with a bounce-component operation unit 50, a pitch-component operation unit 51, and a roll-component operation unit 52. The bounce-component operation unit 50 is to operate a bounce component of vibration of the vehicle by totaling three outputs $G_{FL}$, $G_{FR}$ and $G_R$ from the three vertical acceleration sensors 15 for the left-hand and right-hand front wheels 2FL, 2FR, and the rear wheels 2R, respectively. The pitch-component operation unit 51 is to operate a pitch component of vibration of the vehicle by summing halves of the outputs $G_{FL}$ and $G_{FR}$ and then subtracting the output $G_R$ from the resulting sum. The roll-component operation unit 52 is to operate a roll component of vibration by subtracting the output $G_{FL}$ on the left-hand front wheel 2FL side from the output $G_{FR}$ on the right-hand front wheel 2FR side.

The bounce component of vibration of the vehicle operated by the bounce-component operation unit 50 is then inputted into a bounce-component control unit 53 which operates a bounce-component control amount to the flow amount control valve 9 of each wheel on the basis of a formula of IPD (Integral-Proportional-Differential) control as follows:

$$\{T_{B3}/(1+T_{B3}\times S)\}\times K_{B3}+K_{B4}+\{T_{B5}\times S/(1+T_{B5}\times S)\}\times K_{B5}$$

(wherein $T_{B3}$, $K_{B3}$, $K_{B4}$, $T_{B5}$ and $K_{B5}$ each are a control coefficient; and S is an operator).

The pitch component of vibration operated by the pitch-component operation unit 51 is then inputted into a pitch-component control unit 54 which operates pitch-component control amount to the flow amount control valve 9 of each wheel on the basis of an IPD (Integral-Proportional-Differential) control formula as follows:

$$\{T_{P3}/(1+T_{P3}\times S)\}\times K_{P3}+K_{P4}+\{T_{P5}\times S/(1+T_{P5}\times S)\}\times K_{P5}$$

(wherein $T_{P3}$, $K_{P3}$, $K_{P4}$, $T_{P5}$ and $K_{P5}$ each are a control coefficient; and S is an operator).

The roll component of vibration of the vehicle operated by the roll-component operation unit 52 is then inputted into a roll-component control unit 55 which likewise operates a roll-component control amount to the flow amount control valve 9 of each wheel on the basis of an IPD (Integral-Proportional-Differential) control formula as follows:

$$\{T_{R3}/(1+T_{R3}\times S)\}\times K_{R3}+K_{R4}+\{T_{R5}\times S/(1+T_{R5}\times S)\}\times K_{R5}$$

(wherein $T_{R3}$, $K_{R3}$, $K_{R4}$, $T_{R5}$ and $K_{R5}$ each are a control coefficient; and S is an operator).

In order to control the vertical vibration with the bounce component, the pitch component, and the roll component, each of the control amounts operated by each of the control units 53, 54 and 55 at each of the wheels is reversed in the same manner as hereinabove and then the bounce-component, pitch-component and roll-component control amounts are added to thereby provide a control amount $Q_{FL}$, $Q_{FR}$, $Q_{RL}$ and $Q_{RR}$ for the corresponding fluid cylinders $3_{FL}$, $3_{FR}$, $3_{RL}$ and $3_{RR}$. It is to be noted herein that the control amounts on the front wheel side, operated by the control units 53, 54 and 55, are corrected by a correction coefficient k (k=1.08) because loads applied to the front wheels differ from those applied to the rear wheels.

Then, the control system C is provided with a warp control unit 60 consisting of a front-wheel-side load-transfer ratio operation subunit 60a and a rear-wheel-side load-transfer ratio operation subunit 60b. The front-wheel-side load-transfer ratio operation subunit 60a, on the one hand, is to operate a ratio (a load-transfer ratio) of a liquid pressure difference ($P_{FL}-P_{FR}$) between the liquid pressures of the respective left-hand and right-hand front wheels 2FL and 2FR to a sum of the liquid pressures of the front wheels by generating signals of liquid pressures $P_{FL}$ and $P_{FR}$ from the two liquid pressures 13 on the front wheel side. The rear-wheel-side load-transfer ratio operation subunit 60b, on the other hand, is to operate a ratio (a load-transfer ratio) of a liquid pressure difference ($P_{RL}-P_{RR}$) between the liquid pressures of the respective left-hand and right-hand rear wheels 2RL and 2RR to a sum of the liquid pressures of the rear wheels by generating signals of the liquid pressures $P_{RL}$ and $P_{RR}$ from the two liquid pressure sensors 13 on the rear wheel side. The load-transfer ratio on the rear wheel side is then multiplied by a coefficient Wr and thereafter the product is subtracted from the load-transfer ratio on the front wheel side. The difference is then multiplied by a coefficient $W_A$ and then corrected with a correction coefficient (1.08). Then, the control amount for each of the wheels is reversed in the same manner as hereinabove to be made uniform between the left-hand and right-hand wheels, thereby giving control amounts $Q_{FL}$, $Q_{FR}$, $Q_{RL}$ and $Q_{RR}$.

Furthermore, the control amount $Q_{FR}$ obtained in FIG. 3A, the control amount $Q_{FR}$ obtained in FIG. 3B, and the control amount $Q_{FR}$ obtained in FIG. 3C are added to each other and the resulting sum is finally used as a control amount for the flow amount control valve 9 for the right-hand front wheel. In the same manner, the control amounts $Q_{FL}$, $Q_{RR}$ and $Q_{RL}$ were treated and used for the respective for the respective flow amount control valves 9 therefor.

As shown further in FIG. 3C, the second suspension-characteristic changing means 62 has two modes: NORMAL and SPORT(2). The coefficient Wr in the warp control is altered so as to be variable in accordance with a shift by a manufal switch 61 between the "NORMAL" mode and "SPORT (2)" mode. In other words, the coefficient Wr is set to Wr=1.5 at the "NORMAL" mode while the coefficient Wr is set to Wr=1.0 at the "SPORT (2)" mode. When the manual switch 61 is shifted to the "NORMAL" mode, the load-transfer ratio on the front wheel side is rendered greater than that on the rear wheel side by setting the coefficient Wr to 1.5, thereby elevating a roll rigidity ratio on the front wheel side and altering the suspension characteristic with the tendency of an increasing understeer. When the manual switch 61 is shifted to the "SPORT (2)" program, the load-transfer ratio on the front wheel side is rendered equal to that on the rear wheel side by setting the coefficient Wr to 1.0, thereby altering the suspension characteristic to the tendency of a usually weak understeer.

Figure 3D:
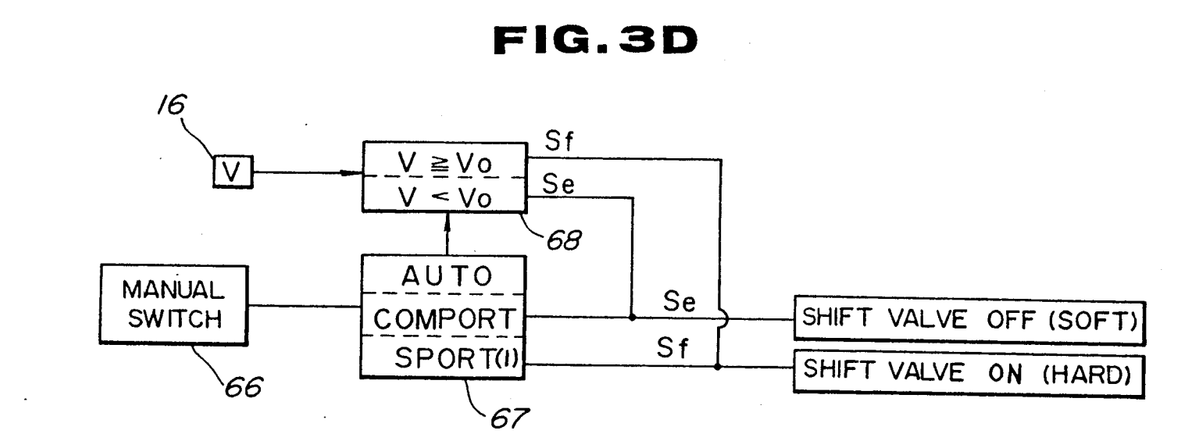
FIG. 3D represents an example of control systems for shifting a suspension characteristic between softer and harder states.

Turning to FIG. 3D, a manual switch 66 is provided to manually shift a suspension characteristic in accordance with a driver's preference or a driving state. The manual switch 66 is connected to a mode judging unit 67 for judging three modes: COMFORT, SPORT (1), and AUTO. The three modes are manually chosen by the manual switch 66. When the mode judging unit 67 judges that the manual switch 66 has chosen the COMFORT mode, a signal Se is generated to alter a suspension characteristic to a softer state and, as shown in FIG. 2, the shift valve 27 is turned OFF to take an open position. When the SPORT (1) mode is judged by the mode judging unit 67, a signal Sf is generated to alter a suspension characteristic to a harder state, thereby turning the shift valve 27 ON to take a close position. When the mode judging unit 67 judges the AUTO mode, the shift valve 27 controls an ON/OFF shift in accordance with a vehicle speed to be judged by a vehicle speed judging unit 68. The vehicle speed judging unit 68 is to compare a vehicle speed V with a set value Vo in response to a signal of the vehicle speed V sensed by the vehicle speed sensor 16. And, when it is judged as a high speed driving state such that the sensed vehicle speed V is equal to or greater than the set value Vo, on the one hand, the signal Sf is generated for altering the suspension characteristic to a harder state and the shift valve 27 on the front wheel side only is turned ON to take the close position. When the vehicle speed judging unit 68 judges to be a low speed driving state as the sensed vehicle speed V is lower than the set value Vo, the signal Se for changing the suspension characteristic to a softer state is generated so as to control the shift valve 27 in the OFF manner to take an open position.

Figure 4:
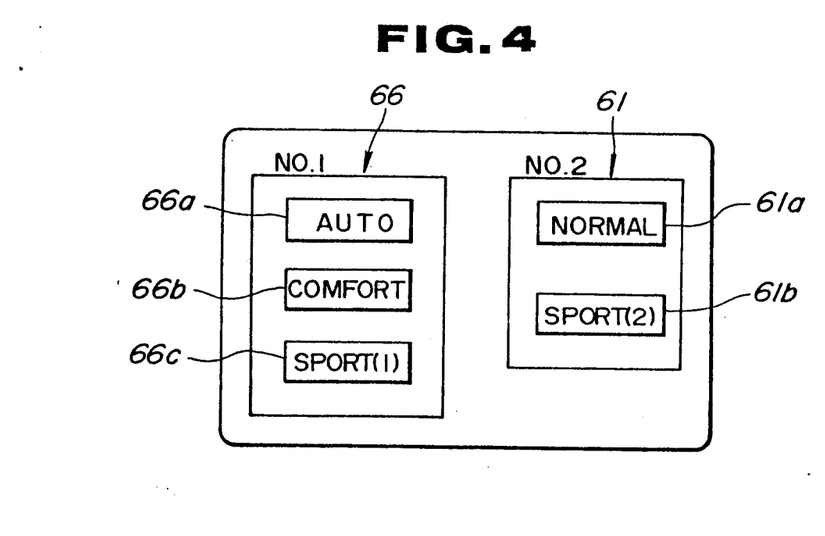
FIG. 4 is a diagram showing an example of switches to be used for shifting the suspension characteristic.

FIG. 4 shows a detail of operating the switches 61 and 66. The switch 61 has two operating buttons: an operating button 61a with the word "NORMAL" on and an operating button 61b with the word "SPORT(2)" on. The switch 66 has three operating buttons: an operating button 66a with the word "AUTO" on, an operating button 66b with the word "COMFORT" on, and an operating button 66c with the word "SPORT(1)" on. Each of the operating buttons 61a, 61b, 66a, 66b and 66c may be of a type which is operable as it is pressed. When one of the operating buttons is pressed, the suspension characteristic is designed so as to correspond to the operating button that was pressed. The operating buttons 61 and 66 are mounted in a position on an instrument panel or the like, where the driver can handle them easily.

Figure 6:
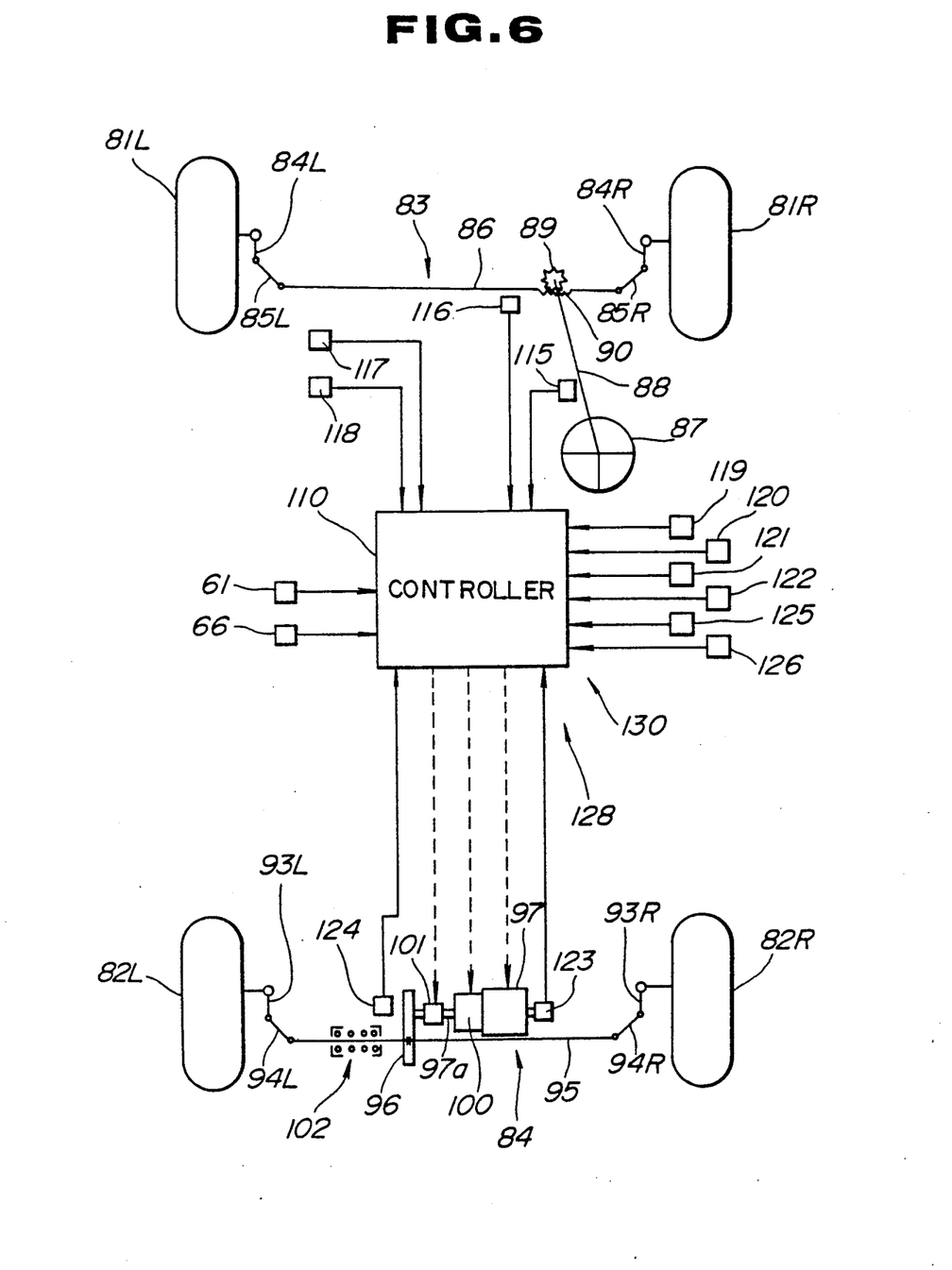
FIG. 6 is a plan view showing an example of a rear-wheel steering unit.

Referring now to FIG. 6 showing an outline of the construction of the vehicle which is subject to four-wheel steering, reference alphanumerals 81L and 81R denote left-hand and right-hand front wheels while reference alphanumerals 82L and 82R denote left-hand and right-hand rear wheels, respectively. The left-hand front wheel 81L is connected through a front-wheel steering mechanism 83 to the right-hand front wheel 81R, while the left-hand rear wheel 82L is connected through a rear-wheel steering mechanism 84 to the right-hand rear wheel 82R.

The front-wheel steering mechanism 83 comprises a pair of a left-hand knuckle arm 84L and a right-hand knuckle arm 84R, a pair of a left-hand tie rod 85L and a right-hand tie rod 85R, and a front-wheel steering rod 86 connecting the tie rods 85L and 85R to each other. Reference numeral 87 denotes a steering wheel which is connected to a shaft 88. At a lower end portion of the shaft 88 is mounted a pinion 89 which is in mesh with a rack 90 disposed at the front wheel steering rod 86. And the front wheels 81L and 81R are steered by displacing the front-wheel steering rod 86 in accordance with operation of the steering wheel 87.

Like the front-wheel steering mechanism 83, the rear-wheel steering mechanism 84 comprises a pair of left-hand and right-hand knuckle arms 93L, 93R and a pair of left-hand and right-hand tie rods 94L, 94R, respectively, as well as a rear-wheel steering rod 95. To the rear-wheel steering rod 95 is connected a decelerating mechanism 96 which in turn is connected to an output shaft 97a of a surbo motor 97. And the rear wheels 82L and 82R are steered by transferring the rear-wheel steering rod 95 through the decelerating mechanism 96 by means of revolution of the surbo motor 97.

In the rear-wheel steering mechanism 84, the output shaft 97a of the surbo motor 97 is provided with an electromagnetic brake 100 which is designed so as to lock the output shaft 97a of the motor and the rear-wheel steering rod 95 during its braking operation, thereby retaining a steered state of the rear wheels 82L and 82R. Between the output shaft 97a of the surbo motor 97 and the decelerating mechanism 96 is disposed an electromagnetic clutch 101, and the rear-wheel steering rod 95 is provided with a position-returning mechanism 102 for returning the rear-wheel steering rod 95 to a neutral position. When the rear wheels are steered in an abnormal way, the electromagnetic clutch 101 is opened to disconnect the rear-wheel steering rod 95 from the surbo motor 97, thereby returning the rear-wheel steering rod 95 to its neutral position by means of the position-returning mechanism 102 and, as a consequence, positioning the rear wheels 82L and 82R to their neutral position in which their steered angle is zero.

Referring further to FIG. 6, reference numeral 110 denotes a controller for controlling a steering angle of the rear wheels and the controller 110 basically controls the surbo motor 97 and the electromagnetic brake 100. The controller 110 receives signals from various sensors 115 to 126 and from the switches 61 and 66. The sensor 115 is a steering-angle sensor, and the sensor 116 is a front-wheel steering angle sensor for sensing a steering angle of the front wheel by an amount in which the front-wheel steering rod 86. Reference numerals 117 and 118 denote two vehicle speed sensors, and reference numeral 119 denotes a neutral clutch switch for sensing the N (neutral) position of a manual transmission and a point of time when a clutch pedal is stepped. Reference numeral 120 stands for an inhibitor switch for sensing the N position or P (parking) position of an automatic transmission, and reference numeral 121 stands for a brake switch for sensing a point of time when a braking pedal is stepped. Reference numeral 122 denotes an engine switch for sensing the time when the engine is being driven. Reference numeral 123 stands for a rotational angle sensor for sensing a rotational angle of the surbo motor 97 and reference numeral 124 for a rear-wheel steering-angle sensor for sensing a steering angle of the rear wheels by means of an amount in which the rear-wheel steering rod 95 is transferred.

Figure 5:
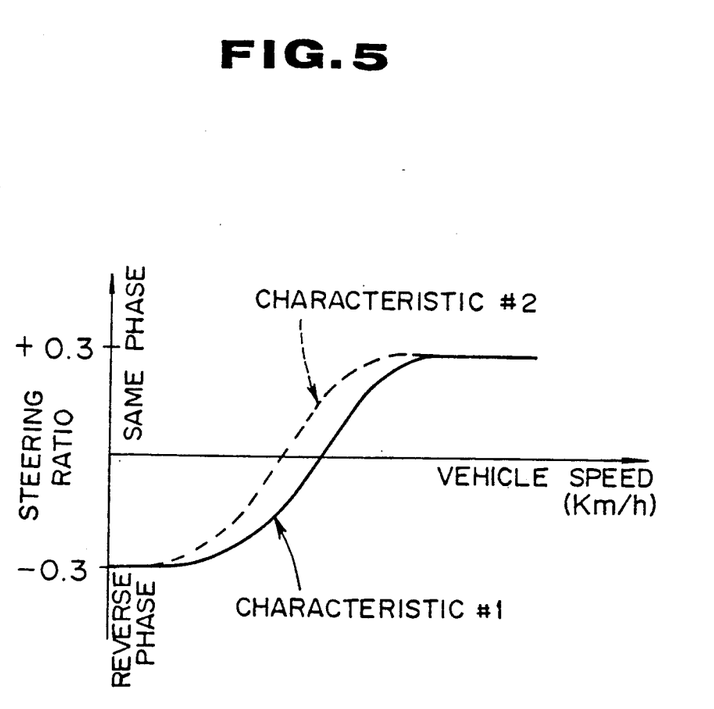
FIG. 5 is a graph showing an example in which rear-wheel steering characteristics are set.

The controller 110 for controlling the rear-wheel steering angle previously stores a rear-wheel steering characteristic as is shown in FIG. 5. The rear-wheel steering characteristic shown in FIG. 5 are characteristics in which a rear-wheel steering ratio, namely, a ratio of an rear-wheel steering angle $\theta_R$ to a front-wheel steering angle $\theta_F$ (wherein the front-wheel steering angle $\theta_F$ is proportional to a steering angle H), varies with a vehicle speed and which changes from a same phase side to a reverse phase side in accordance with a transfer from a low vehicle speed to a high vehicle speed. As shown in FIG. 5, the characteristic #1 as indicated by the solid line is set such that the steering characteristic is deviated toward the same phase side from characteristic #2 as indicated by the broken line at the same vehicle speed.

Referring back to FIG. 6, a steering control means 128 is arranged so as to control the rear-wheel steering mechanism 84 according to the characteristic #1 or #2 as shown in FIG. 5 by means of the controller 110 for controlling a steering angle of the rear wheels.

Each of the controllers 67 and 110 for the change of the suspension characteristics and for the control of the rear-wheel steering ratio, respectively, has the function of receiving and sending signals selected by each of the manual switches 61 and 66, and the controller 110 has the function of selecting the steering characteristic of the rear wheels according to the mode by shifting the characteristic #1 or #2 of FIG. 5 in accordance with the table as shown hereinbelow. As have been described hereinabove, the controller 110 comprises a steering-characteristic storing means, in which the two steering characteristics as shown in FIG. 5 are stored in a ROM, and a steering-characteristic selecting means for selecting each one of the two steering characteristics according to the following table.

TABLE

|   |                       | CHARAC-<br>TERISTIC<br>#1 | CHARAC-<br>TERISTIC<br>#2 |
|---|-----------------------|---------------------------|---------------------------|
| 1 | All Four Wheels: SOFT |                           | COMFORT                   |
| 2 | All Four Wheels: HARD | SPORT (1)                 |                           |
| 3 | Only Front Wheels: SOFT |                         | AUTO<br>Low Speed         |
| 4 | Only Front Wheels: HARD | AUTO<br>High Speed      |                           |
| 5 | Wr = 1.5              |                           | NORMAL                    |
| 6 | Wr = 1.0              | SPORT (2)                 |                           |

A steering-characteristic correcting means 130 is arranged so as to correct the rear-wheel steering characteristic to the characteristic #1 or #2 as shown in FIG. 5 in synchronization with the suspension characteristic to be altered by means of the first or second suspension-characteristic changing means 39 or 62 in accordance with the control as shown in Table above. In particular, when the suspension characteristic is altered by the second suspension-characteristic changing means 62 to show the tendency in which understeer is reduced by setting the coefficient Wr for the warp control to 1.0, when the manual switch 61 is manually shifted to the SPORT(2) mode as shown in item 6 of the Table above, the steering-characteristic correcting means 130 corrects the rear-wheel steering characteristic on the reverse phase side with respect to the front wheels by setting the characteristic #1 of FIG. 5, in synchronization with alteration of the suspension characteristic with a decreasingly understeering tendency.

When the manual switch 66 is shifted to the AUTO mode as shown in item 4 of the Table above and the vehicle speed V is set to such a high speed driving as being equal to or greater than the set value Vo, the shift valves 27 for the front wheels only as shown in FIG. 2 are turned ON to take the close position, thereby allowing the first suspension characteristic changing means 62 to alter the suspension characteristic to a harder state on the front wheel side and to a softer state on the rear wheel side with the tendency in which understeer is increased. In this case, the rear-wheel steering characteristic is set to the characteristic #1 as shown in FIG. 1 and corrected to the reverse phase side with respect to the front wheels, in synchronization with the alteration of the suspension characteristic.

When the manual switch 66 is shifted to the COMFORT position as shown in the item 1 of the Table above, the shift valve 27 is turned off and shifted to the open position, thereby permitting the oil to be supplied to or discharged from the fourth spring 5d of each of the gas springs 5FL, 5FR, 5RL and 5RR and altering the suspension characteristic to a softer state by that degree. In synchronization with the alteration of the suspension characteristic, the rear-wheel steering characteristic is chosen to be set to the stationary characteristic #2 of FIG. 5. As a result, a favorable maneuverability of the vehicle can be provided by complying a soft ride comfort with a good running performance.

When the manual switch 66 is shifted to the SPORT(1) as shown in item 2 of the Table above, the shift valve 27 is shifted to the closing position to thereby regulate a supply of the oil to or a discharge thereof from each of the fourth springs 5d and consequently change the suspension characteristic by that degree to a harder state. The steering characteristic on the rear wheel side is corrected toward the reverse phase side opposite to the front wheel by selecting the rear-wheel steering characteristic from the stationary characteristic #2 to the characteristic #1 as shown in FIG. 5 in synchronization with the alteration in the suspension characteristic. As a consequence, a favorable sport type drivability can be obtained by combining a relatively hard ride comfort with a sharp movement of the vehicle.

When the manual switch 61 is shifted to the SPORT(2) position as shown in item 6 of the Table above, the coefficient Wr for the warp control is set to 1.0 and the load-transfer ratio on the front wheel side is made identical to that on the rear wheel side, thereby altering the suspension characteristic to the tendency in which the understeer is reduced. In synchronization with this alteration, the characteristic #1 as shown in FIG. 5 is chosen as the rear-wheel steering characteristic and the rear-wheel steering characteristic is corrected to be located on the reverse phase side with respect to the front wheels. Accordingly, the tendency of reducing the understeer is promoted, thereby providing a favorable sport drivability and stability.

During a high speed driving period when the vehicle speed V is equal to or greater than the set value Vo in case where the manual switch 66 is shifted to the AUTO mode as shown in item 4 of the Table above, only the shift valves 27 on the front wheel side are turned on and shifted to the close position, thereby changing the suspension characteristic on the front wheel side to a harder state and on the rear wheel side to a softer state. As a consequence, the driver can enjoy a feeling of driving stability and a favorable ride comfort of the vehicle. At that time, the load-transfer ratio on the front wheel side becomes larger than that on the rear wheel side in accompany with alteration of the suspension characteristic on the front wheel side to a harder state, thereby altering the suspension characteristic to the tendency of increasing the understeer. However, as the rear-wheel steering characteristic is selected to the characteristic #1 as shown in FIG. 5 and corrected to be located on the reverse phase side opposite to the front wheels in synchronization with the alteration in the suspension characteristic, thereby regulating and offsetting the tendency of increasing the understeer and making the impact of the suspension characteristic upon drivability of the vehicle smaller. As a result, even during a high speed driving period, cornering performance can be improved with a favorable stability combined with ride comfort of the vehicle, thereby improving drivability.

Although the above description is directed to the suspension apparatus with the gas springs 5, it is to be understood as a matter of course that the present invention can be applied to a suspension apparatus in which no gas spring is mounted and only the fluid cylinder 3 is mounted so as to change the suspension characteristic.

It is to be understood that the present invention is not restricted to those described hereinabove as illustrative, not as restrictive, and the invention should be interpreted to encompass modifications and variations within the spirit and scope of the present invention.

What is claimed is:

1. A suspension-steering control apparatus comprising:
   suspension-characteristic changing means for changing a suspension characteristic;
   a rear-wheel steering mechanism for steering rear wheels of a vehicle;
   steering control means for controlling said rear-wheel steering mechanism on the basis of a predetermined steering characteristic; and
   steering-characteristic correcting means for correcting said steering characteristic in synchronization with so as to assist alteration of the suspension characteristic by said suspension-characteristic changing means.

2. A suspension-steering control apparatus as claimed in claim 1, wherein said steering-characteristic correcting means corrects said steering characteristic in a direction of a reverse phase side, in synchronization with alteration of said suspension characteristic by said suspension-characteristic changing means in a direction of decreasing understeer of the vehicle.

3. A suspension-steering control apparatus as claimed in claim 1, wherein said steering-characteristic correcting means corrects said steering characteristic in a direction of a same phase side, in synchronization with alteration of said suspension characteristic by said suspension-characteristic changing means in a direction of decreasing understeer of the vehicle.

4. A suspension-steering control apparatus as claimed in claim 1, wherein said steering-characteristic correcting means comprises:
   memory means for storing the steering characteristic corresponding to the suspension characteristic; and
   selection means for selecting the steering characteristic from plural steering characteristics stored by said memory means, the steering characteristic corresponding to the suspension characteristic changed by said suspension-characteristic changing means.

5. A suspension-steering control apparatus claimed in claim 1, wherein said suspension-characteristic changing means changes the suspension characteristic by changing a rolling rigidity ratio of the front wheel side to the rear wheel side.

6. A suspension-steering control apparatus as claimed in claim 1, wherein:
   said suspension-characteristic changing means changes the suspension characteristic between a first state and a second state, the first state being in which a damping force of a suspension is rendered soft on the front wheels only and the second state being in which the damping force thereof is rendered hard on the front wheels only; and
   said steering-characteristic correcting means corrects said steering characteristic in a direction of the reverse phase side when said suspension characteristic is changed to said first state, as compared with when it is changed to the second state.

7. A suspension-steering control apparatus as claimed in claim 6, wherein:
   said suspension-characteristic changing means changes the suspension characteristic in the first state when a vehicle speed as a parameter is low and and in the second state when the vehicle speed is high.

8. A suspension-steering control apparatus claimed in claim 1, wherein:
   said suspension-characteristic changing means changes the suspension characteristic between a first state and a second state, the first state being in which a rolling ridigity ratio of the front wheel side to the rear wheel side becomes large and the second state being in which said rolling ridigity ratio becomes small; and
   said steering-characteristic correcting means corrects said steering characteristic in a direction of the reverse phase side when said suspension characteristic is changed to said first state, as compared with when it is changed to said second state.

9. A suspension-steering control apparatus as claimed in claim 1, wherein said suspension-characteristic changing means changes the suspension characteristic by changing a damping force of a suspension.

10. A suspension-steering control apparatus as claimed in claim 1, wherein a suspension comprises a cylinder unit and a gas spring connected to said cylinder unit, said cylinder unit being disposed between a sprang weight and an unsprung weight for each wheel so as to adjust a ride height of the vehicle in accordance with a supply of an operating fluid to or a discharge thereof from said cylinder unit.

11. A suspension-steering control apparatus as claimed in claim 10, further comprising a pressure detecting means for detecting a pressure in each cylinder unit;
   wherein said suspension control means comprises a first ratio determining means and a second ratio determining means, said first ratio determining means being for determining a first ratio of a sum to a difference said sum being obtained by adding two output values of two pressure detecting means for cylinder units disposed at the front wheels and said difference being obtained by subtracting one output value for of said two pressure detecting means for the front wheels from the other output value for the other of said two pressure detecting means therefor, and said second ratio determining means being for determining a second ratio of a sum to a difference, said sum being obtained by adding two output values of two pressure detecting means for cylinder units disposed at the rear wheels and said difference being obtained by subtracting one output value for one of said two pressure detecting means for the rear wheels from the other output value for the other of said two pressure detecting means therefor; and wherein said suspension-characteristic changing means corrects either one of said first and second ratios determined by said first and second ratio determining means.

12. A suspension-steering control apparatus as claimed in claim 10, wherein a variable orifice is interposed between said cylinder unit and said gas spring; and said suspension-characteristic changing means changes a damping force by controlling said variable orifice.

13. A suspension-steering control apparatus as claimed in claim 10, further comprising a suspension control means for controlling a supply of an operating fluid to or a discharge thereof from said cylinder unit in accordance with a predetermined condition;

wherein said suspension-characteristic changing means changes said predetermined condition.

14. A suspension-steering control apparatus as claimed in claim 13, further comprising a pressure detecting means for detecting a pressure in each cylinder unit;

wherein said suspension control means controls an action of a warping force between a front portion of a vehicle body and a rear portion thereof in response to an output from each of pressure detecting means.

15. A suspension-steering control apparatus as claimed in claim 14, wherein said suspension-characteristic correcting means corrects the warping force of either of the front portion of the vehicle body or the rear portion thereof.

16. A suspension-steering control apparatus as claimed in any one of claims 1 to 11, wherein said steering characteristic is set by using a vehicle speed as a parameter.

17. A suspension-steering control apparatus as claimed in claim 16, wherein said steering characteristic is set such that rear wheels are steered further toward the same phase side when the vehicle speed is greater, than when it is lower.

18. A suspension-steering control apparatus as claimed in claim 17, wherein said rear wheels are steered in a direction opposite to said front wheels when said vehicle speed is smaller than a given vehicle speed or said rear wheels are steered in the same direction as said front wheels when said vehicle speed is greater than said given speed.

19. A suspension-steering control apparatus comprising:

a rear-wheel steering mechanism for steering rear wheels;

a selection means for selecting a characteristic combination by manual operation from a plurality of characteristics combinations so set as to correspond to a suspension characteristic and a steering characteristic;

a suspension-characteristic changing means for changing the suspension characteristic so as to produce another suspension characteristic corresponding to said characteristic combination selected by said selection means; and a steering control means for controlling said rear wheel steering mechanism on the basis of the steering characteristic corresponding to said characteristic combination chosen by said selection means;

wherein said plurality of characteristic combinations is set so as to allow the steering characteristic to assist the suspension characteristics.

20. A suspension-steering control apparatus as claimed in claim 19, wherein:

a first suspension characteristic for hardening a suspension for front wheels and a second suspension characteristic for softening a suspension for front wheels are set as the suspension characteristics;

a first steering characteristic and a second steering characteristic set on the same phase side are set as the steering characteristics; and said characteristic combinations comprise a combination of said first suspension characteristic with said first steering characteristic and a combination of said second suspension characteristic with said second steering characteristic.

21. A suspension-steering control apparatus as claimed in claim 19, wherein:

said selection means has an automatic selection mode for allowing automatic selection; and one predetermined characteristic combination is selected from said plurality of characteristic combinations on the basis of a predetermined condition when said automatic selection mode is selected.

22. A suspension-steering control apparatus as claimed in claim 21, wherein:

said predetermined condition is set using vehicle speed as a parameter.

23. A suspension-steering control apparatus as claimed in claim 19, wherein:

a first suspension characteristic for hardening a suspension for front and rear wheels and a second suspension characteristic for softening a suspension for front and rear wheels are set as the suspension characteristics;

a first steering characteristic and a second steering characteristic set on the same phase side are set as the steering characteristics; and said characteristic combinations comprise a combination of said first suspension characteristic with said first steering characteristic and a combination of said second suspension characteristic with said second steering characteristic.

* * * * *